(12) United States Patent  
Brouwer

(10) Patent No.: US 7,506,857 B2
(45) Date of Patent: Mar. 24, 2009

(54) MIRROR SUPPORTING PLATE, MIRROR ADJUSTING MECHANISM, METHOD FOR MANUFACTURING A MIRROR SUPPORTING PLATE, AND METHOD FOR ASSEMBLING A MIRROR ADJUSTING MECHANISM

(75) Inventor: Stefan F. Brouwer, Den Haag (NL)

(73) Assignee: MCI (Mirror Controls International) Netherlands, B.V., Montfoort (NL)

( * ) Notice: Subject to any disclaimer, the term of this patent is extended or adjusted under 35 U.S.C. 154(b) by 0 days.

(21) Appl. No.: 10/549,963

(22) PCT Filed: Mar. 19, 2004

(86) PCT No.: PCT/NL2004/000168

§ 371 (c)(1),
(2), (4) Date: Aug. 3, 2006

(87) PCT Pub. No.: WO2004/087462

PCT Pub. Date: Oct. 14, 2004

(65) Prior Publication Data

US 2007/0108362 A1  May 17, 2007

(30) Foreign Application Priority Data

Mar. 20, 2003 (NL) .................................. 1022982

(51) Int. Cl.
A47G 1/24 (2006.01)

(52) U.S. Cl. .................... 248/476; 248/479; 248/481
(58) Field of Classification Search .............. 248/481, 248/475.1, 476, 477, 479, 480, 482, 484, 248/485, 487; 359/873
See application file for complete search history.

(56) References Cited

U.S. PATENT DOCUMENTS

| | | | |
|---|---|---|---|
| 4,056,253 A | 11/1977 | Repay et al. | |
| 4,422,724 A * | 12/1983 | Otsuka et al. | 359/875 |
| 5,436,769 A * | 7/1995 | Gilbert et al. | 359/874 |
| 5,481,931 A * | 1/1996 | Vecchiarino | 74/89.14 |
| 5,931,438 A | 8/1999 | Brouwer | |
| 2002/0163745 A1 | 11/2002 | Sakamoto | |

FOREIGN PATENT DOCUMENTS

| | | |
|---|---|---|
| EP | 0355722 | 2/1990 |
| WO | WO0246001 A1 | 6/2002 |

* cited by examiner

Primary Examiner—Ramon O Ramirez
(74) Attorney, Agent, or Firm—Dykema Gossett PLLC

(57) ABSTRACT

A mirror supporting plate for supporting a mirror glass of a wing mirror for a motor vehicle includes a substantially flat support provided with a substantially rod-shaped actuator part for coupling with a drive. The actuator part is integrally formed with the support and is adjustable relative to the support from a first position in which the actuator part is oriented substantially in or along the plane of the support, to a second position in which the actuator part is oriented so as to reach substantially outwards relative to the support.

13 Claims, 4 Drawing Sheets

MIRROR SUPPORTING PLATE, MIRROR ADJUSTING MECHANISM, METHOD FOR MANUFACTURING A MIRROR SUPPORTING PLATE, AND METHOD FOR ASSEMBLING A MIRROR ADJUSTING MECHANISM

The invention relates to a mirror supporting plate for supporting a mirror glass of a wing mirror for a motor vehicle, comprising a substantially flat support provided with a substantially rod-shaped actuator part for coupling with a drive.

Such a mirror supporting plate is generally known. Normally, the mirror supporting plate comprises a predominantly flat, planar support, such as a plate or a ring. During assembly, the mirror supporting plate is provided on one side with a mirror glass and on the other side connected with an output part of a hinge actuator, so that a mirror adjusting mechanism is formed. The mirror adjusting mechanism in turn is accommodated in a housing of a wing mirror unit for a motor vehicle. The hinge actuator, which often has two motor-driven degrees of freedom, enables a driver of a motor vehicle, by means of an electrical operation from the driver's seat, to position the mirror supporting plate and hence the mirror glass about a substantially upright and a substantially lying pivotal axis in a desired orientation.

During assembly, the mirror supporting plate is composed by providing the support with a substantially rod-shaped actuator part, such as, for instance, a spindle. Further, the support is coupled with an output part of a hinge construction of the hinge actuator, for instance by means of coupling means fitted on the support, or by gluing the support to the output part. Further, the actuator part is coupled with a drive of the hinge actuator. The drive and the hinge construction are then conventionally accommodated on a base part of the hinge actuator. The drive is typically designed as an electric motor whose output shaft is coupled with the actuator part via a speed reduction mechanism. To be able to realize two motor-driven degrees of freedom, the hinge actuator comprises two of such drives which are each connected with the mirror supporting plate via an actuator part.

It will be clear that mass-production assembly of a support and actuator part to form a mirror supporting plate and the assembly of mirror supporting plate and hinge actuator to form a mirror adjusting mechanism is a complex matter. Specifically, the relatively small actuator part must be supplied in the proper orientation and be connected with the support, and subsequently support and actuator part must be connected in the proper orientation with, respectively, the output part of the hinge construction and the output part of the transmission mechanism of the drive. This is specifically complicated when the mirror adjusting mechanism has two motor-driven degrees of freedom, since in that case bringing and keeping the different components in the proper orientation through relative pivoting during mounting is rendered additionally difficult.

The object of the invention is to provide a mirror supporting plate of the type mentioned in the opening paragraph hereof, in which, while maintaining the advantages, the disadvantages mentioned are avoided. In particular, the invention contemplates obtaining a mirror supporting plate where the complexity of mounting the mirror supporting plate to the output part of the hinge actuator is reduced. To that end, the mirror supporting plate according to the invention is characterized in that the actuator part is formed integrally with the support and in that the actuator part is adjustable relative to the support from a first position in which the actuator part is oriented substantially in or along the plane of the support, to a second position in which the actuator part is oriented so as to reach substantially outwards relative to the support.

What is achieved by forming the actuator part and the support as one integrated component is that the two components do not need to be manufactured and supplied separately. What is further achieved is that the actuator part has a predetermined reliable orientation relative to the support, which facilitates assembly. What can be achieved by constructing the actuator part to be adjustable from a first position in which the elongate actuator part extends substantially lying relative to the plane of the support, to a second position in which the actuator part extends substantially transversely relative to the plane of the support, is that the mirror supporting plate when being supplied occupies less space and has less chance of being damaged. Only during assembly is the actuator part adjusted from the first, or transport, position to the second, more voluminous and vulnerable assembly position.

Preferably, the actuator part and the support are at least in the first position connected by means of one or more bridge parts. Through the use of bridge parts, the support can be integrally formed in a simple manner, while yet the adjustment from the first position to the second position can be realized relatively easily. Locally weakened locations can define a bending point here. As an alternative to bridge parts, the intermediate space between support and actuator part can, for instance, be filled up entirely by a connecting film.

By forming at least one of the bridge parts as a torsion hinge, there is obtained, in a simple and inexpensive manner, a hinge construction with which the actuator part can be adjusted from the first position to the second position.

By designing at least one of the bridge parts as a breaking point, the attachment between the actuator part and the support can be broken locally in a simple manner. It is then possible, in making the transition from the first position to the second position, to break a number of bridge parts and to maintain a number of bridge parts. By choosing the dimensioning of the bridge parts differently, it is possible, for instance, to use one type of material to form bridge parts of a small cross section, which are thus easy to break, while furthermore bridge parts can be formed having greater cross sections that can form a torsion hinge, such as a so-called living hinge or line hinge.

It is also possible to temporarily remove the actuator and the support entirely from each other by breaking all bridge parts when making the transition from the first to the second position, and to subsequently couple the actuator and the support with the aid of coupling means again.

Providing coupling means on both the support and the actuator part for forming a snap connection in the second position first of all offers the advantage of a relatively well-defined position of the actuator part during coupling to the drive. Furthermore, it constitutes a simple implementation of an adjusting mechanism from the first position to the second position. In addition, the mounting of such a snap connection can be automated relatively easily.

Constructing at least one of the bridge parts or the coupling means as a ball hinge provides a pivotable connection which offers in a simple manner two or more degrees of freedom to the actuator part relative to the support.

In an embodiment according to the invention, the actuator part constructed as a spindle is provided with a thread for advantageous cooperation of the actuator part with a corresponding thread on the output part of the drive. In an alternative embodiment, the spindle is not provided with a thread, but with a toothing, so that the spindle is formed, for instance, as a rack, with the toothing extending along a shifting shaft or a segment of a gearwheel.

In another embodiment according to the invention, the support comprises an accommodation opening in which the actuator part is accommodated in the first position. As a result, the chance of damage to the actuator part during the pre-assembly condition is reduced further.

Preferably, support, bridge part and actuator part are manufactured from a plastic material, such as, for instance, a thermoplastic plastic material. These materials can be utilized very well in mass production by means of molding techniques, such as injection molding.

By manufacturing at least one of the bridge parts from a plastic material that differs from the material of the support and/or the actuator part, the components referred to can acquire different physical properties, such as, for instance, with regard to stiffness or breaking strength. Further, injecting molding the separate parts in two steps and/or with two components can be simplified, for instance by choosing materials that do not, or hardly so, bond to each other.

The invention also relates to a mirror adjusting mechanism for a wing mirror of a motor vehicle, comprising the above-described base part on which at least one drive and a hinge construction are arranged.

Also, the invention relates to a method for manufacturing a mirror supporting plate, wherein with the aid of an injection molding process a substantially flat support is formed, and wherein a substantially rod-shaped actuator part is formed integrally with the support.

In an embodiment according to the invention, the support on the one hand and the actuator part and/or the bridge part on the other, are manufactured in consecutive injection molding steps. What is thus achieved is that a relatively complex geometry, for instance the ball of a ball hinge in a corresponding socket, can be manufactured relatively simply and inexpensively.

In another embodiment according to the invention, the support on the one hand and the actuator part and/or the bridge part on the other, are manufactured from different materials. Thus a support is obtained that is formed integrally with the actuator part, while allowing the components to have different physical and/or chemical properties, whereby the bridge parts are, for instance, of tougher or, conversely, more brittle, design, or whereby discrete hinge or adjustment parts, while being in mutual contact, are not mutually bonded.

Furthermore, the invention relates to a method for assembling the above-described mirror adjusting mechanism.

Further advantageous embodiments of the invention are set forth in the subclaims.

The invention will be further elucidated on the basis of the exemplary embodiments that are represented in the drawing. In the drawing.

The figures are only schematic representations of preferred embodiments of the invention. In the figures, like or corresponding parts are indicated with the same reference numerals.

Figure 1:
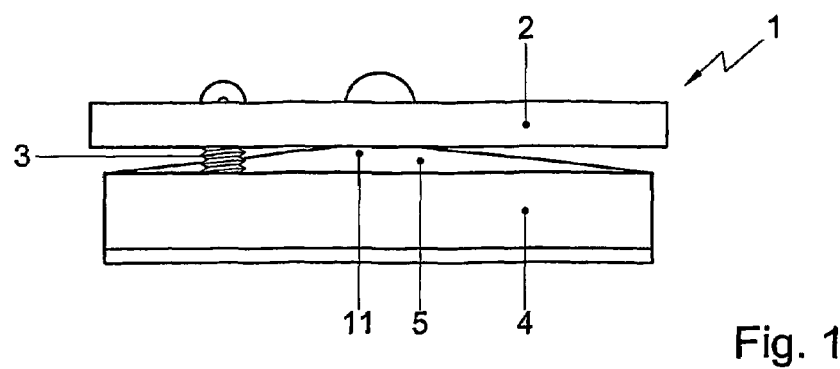
FIG. 1 shows a schematic side view of a mirror adjusting mechanism.

In FIG. 1, there is shown a mirror adjusting mechanism 1 of a wing mirror unit for a motor vehicle. The mirror adjusting mechanism 1 comprises a base part 4 which carries a mirror supporting plate by means of a hinge actuator. The hinge actuator is formed by a hinge construction 5, for instance a ball hinge, and a motor drive, which will be discussed in more detail in connection with FIG. 8. The mirror supporting plate is composed of a flat support 2 and an actuator part 3.

Figure 2:
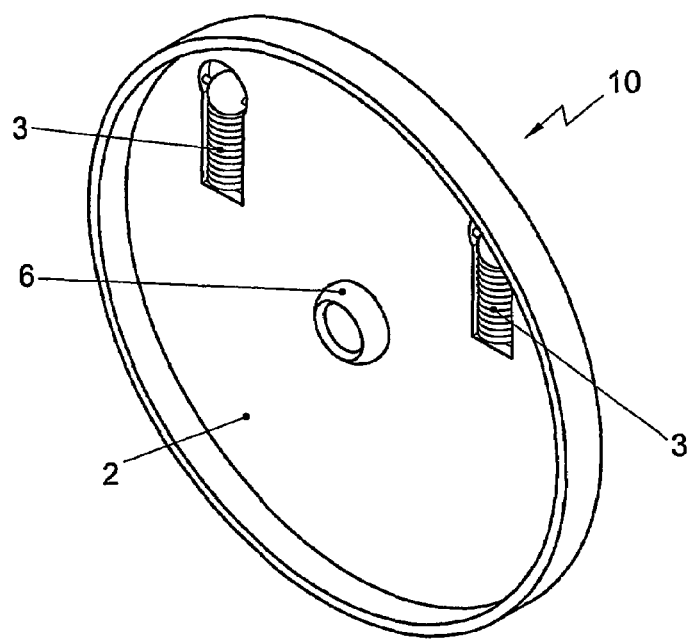
FIG. 2 shows a schematic perspective view of a mirror supporting plate according to the invention in a first position.

As shown in FIG. 2, the support 2 is provided with coupling means 6, such as, for instance, lips, for coupling with an output part 11 of the hinge construction 5. The rod-shaped actuator part 3, also referred to as spindle, is formed integrally with the support 2, and is provided at one end with thread 8, for coupling to an output part of the drive. The output part of the drive, together with the output part 11 of the hinge construction 5, forms the output part of the hinge actuator, so that the hinge actuator is coupled by means of coupling means 6 and thread 8 to the mirror supporting plate 10.

The mirror supporting plate 10 is provided with fixing means (not shown) for fixing a mirror glass (not shown either). The fixing means can comprise, for instance, engaging means for forming a snap connection, or double-sided adhesive tape. An alternative is to fix the mirror glass on the mirror supporting plate 10 using a glued joint. The mirror glass comprises a mirroring surface, which, for instance, is partly built up from glass. However, it is not requisite to use glass. Other materials, such as a suitable plastic, are also possible.

Figure 3:
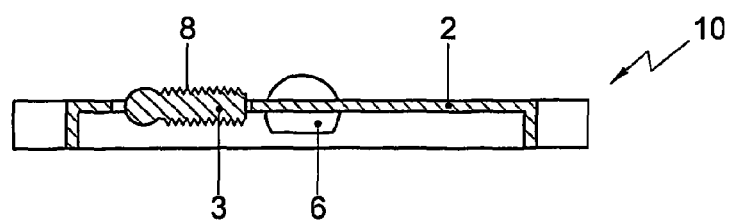
FIG. 3 shows a schematic side view of a mirror supporting plate according to the invention in a first position.

The support 2 and the spindle 3 are integrally formed by means of a molding technique, such as, for instance, two-component injection molding, so that the mirror supporting plate 10 can be manufactured very well in mass production. The spindle 3, in a pre-assembly condition, is connected through bridge parts with the support 2, as represented in more detail in FIG. 7. In this condition, the spindle 3 is received in an accommodation opening 7 in the support 2. The orientation of the spindle 3 is then substantially directed along the plane of the support 2, as also appears from FIG. 3. As a result, the chance of damage during transport is small.

Figure 4:
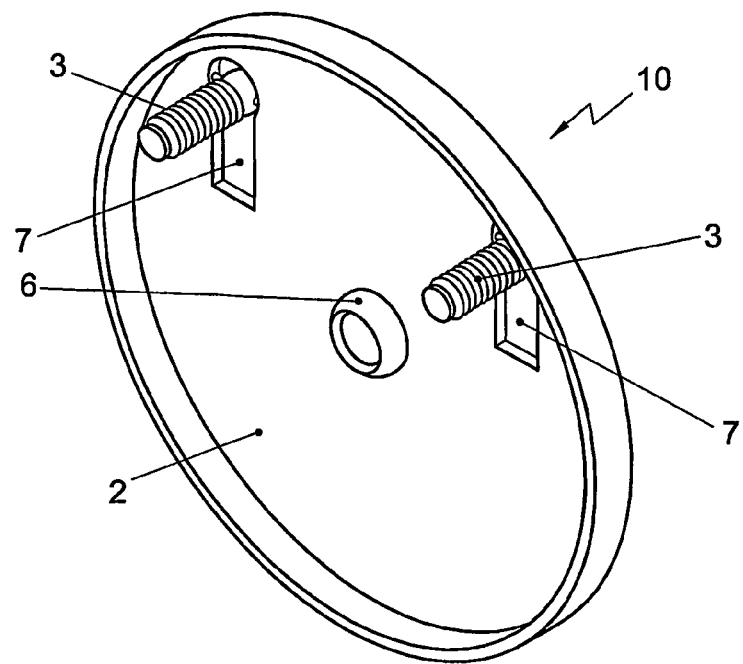
FIG. 4 shows a schematic perspective view of a mirror supporting plate according to the invention in a second position.
Figure 5:
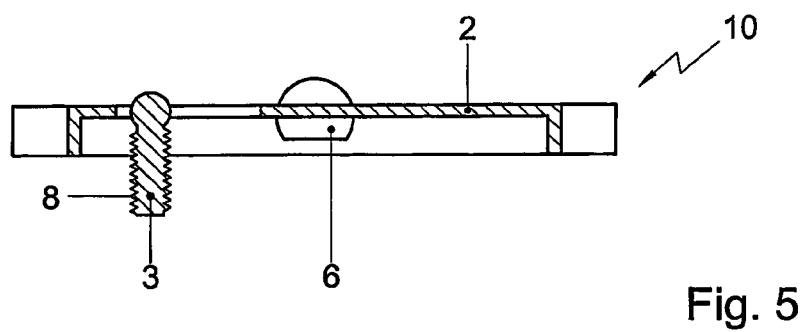
FIG. 5 shows a schematic side view of a mirror supporting plate according to the invention in a second position.

During assembly, the spindle 3 is adjusted from the above-described first position, in which the spindle 3 is oriented substantially along the plane of the support 2, to a second position, in which the spindle is oriented outwardly relative to the plane of the support 2. FIGS. 4 and 5 show the mirror supporting plate 10 in this second position, in which the mirror supporting plate 10 is ready to be coupled, one the one hand, by means of the coupling means 6 of the support 2 to the output part 11 of the hinge construction 5, and, on the other hand, through the thread 8 of the spindle 3 to the output part of the drive, in order to effect the coupling between the mirror supporting plate 10 and the hinge actuator.

Figure 6:
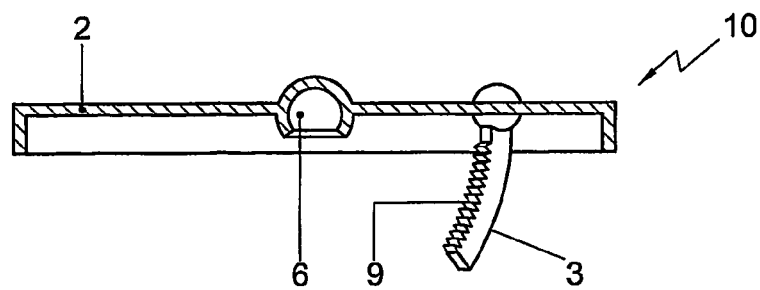
FIG. 6 shows a schematic side view of a different mirror supporting plate according to the invention in a second position.

FIG. 6 shows another embodiment of the mirror supporting plate 10 according to the invention, in which the spindle 3 is formed as a rack with a toothing for engagement of an output part of the drive that is designed as a gearwheel.

Figure 7:
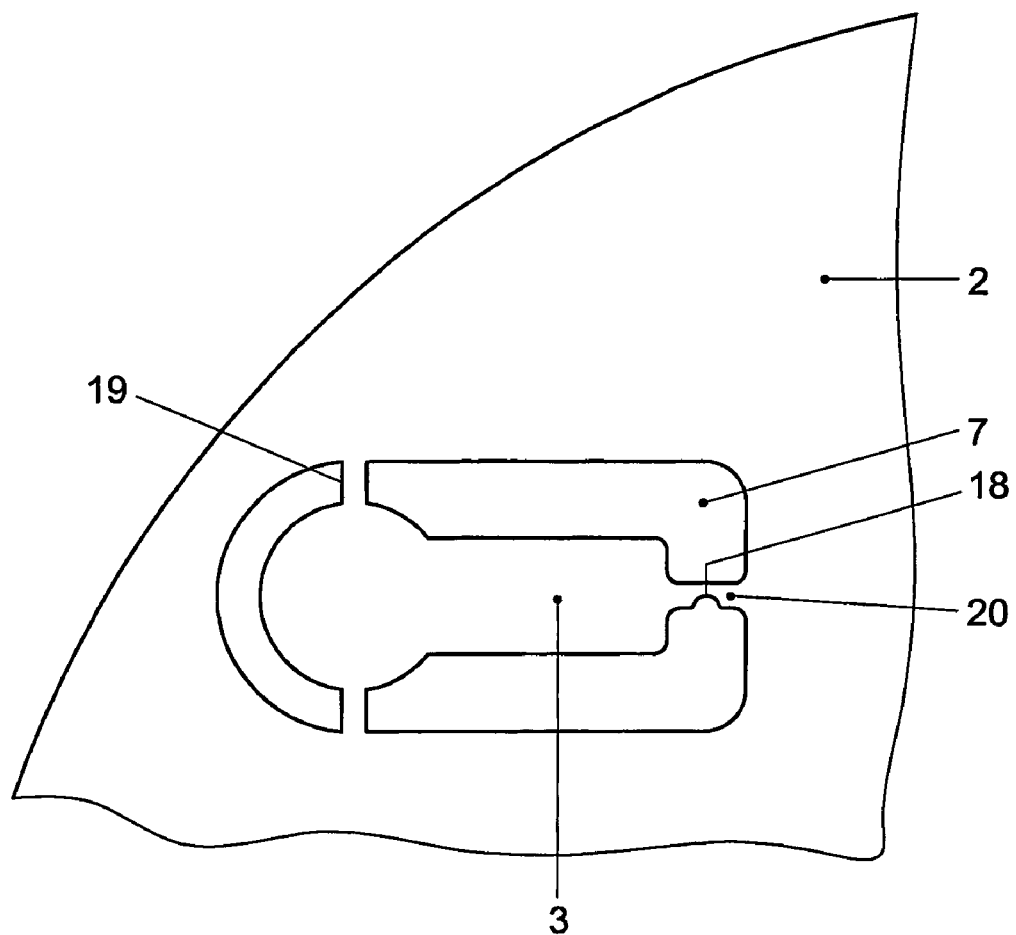
FIG. 7 shows a schematic detailed view of an actuator part according to the invention.

Further, FIG. 7 shows in detail an actuator part 3, where the coupling of the spindle 3 with the support 2 is visible in more detail. Specifically, in the pre-assembly condition the spindle 3 is accommodated in the accommodation opening 7 of the support 2. The spindle 3 is connected with the support 2 by way of three bridge parts. A first bridge part 20 locally has a small cross section 18, so that the bridge part 20 can be easily broken in order for the spindle 3 to assume the above-described second position. Two other bridge parts are designed as line hinges 19, also referred to as living hinges. After breaking of the first bridge part 20, the spindle 3 is pivotable relative to the support 2 via the line hinges 19, which are not locally weakened.

Figure 9:
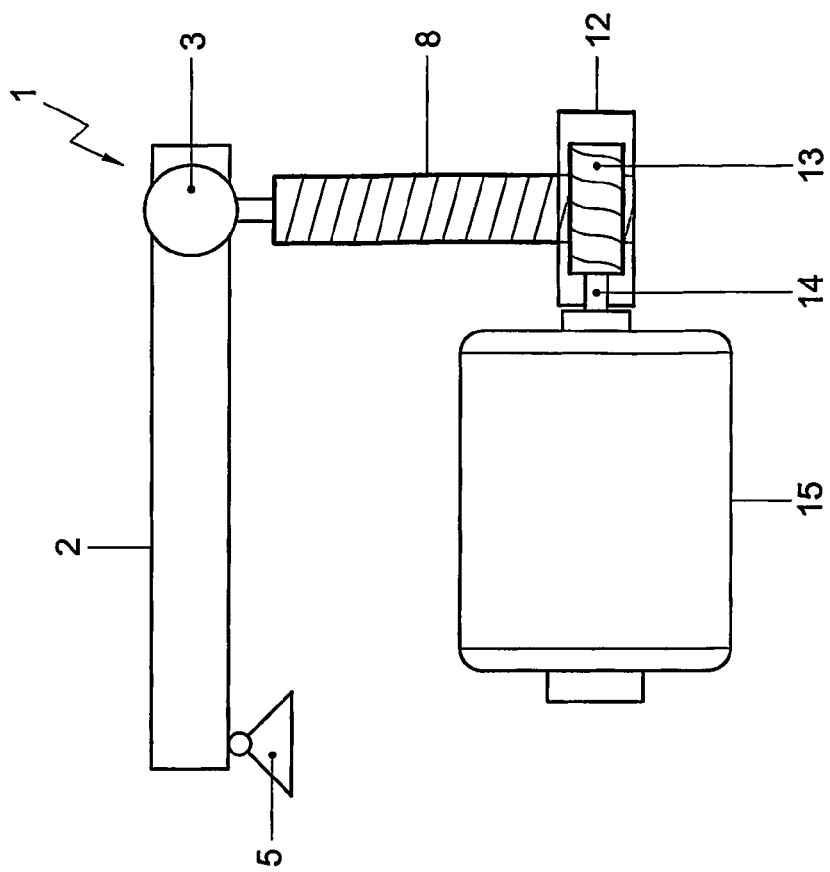
FIG. 9 shows a schematic detailed side view of a drive and an actuator part according to the invention.
Figure 8:
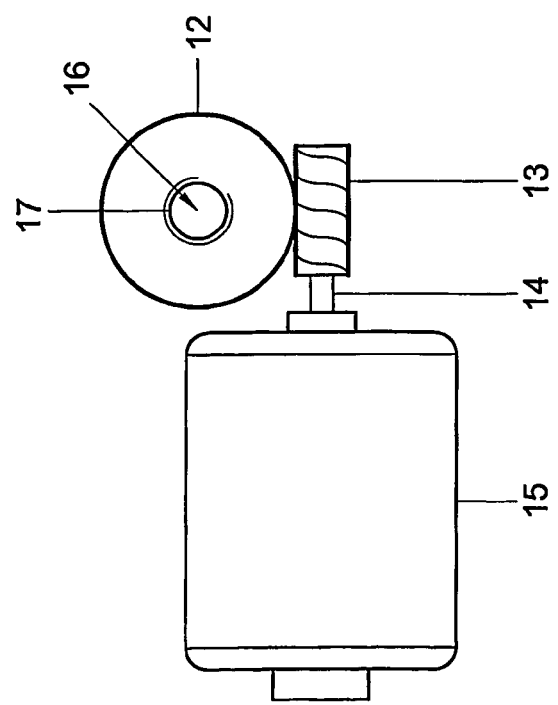
FIG. 8 shows a schematic detailed bottom view of a drive and an actuator part according to the invention.

FIGS. 8 and 9 show the coupling of the actuator part 3 with an output part of the drive. In the construction shown, the drive is formed by an electric motor 15, and the output part of the drive is an output shaft 14 which is provided with a worm 13. The worm 13 is coupled to a worm wheel 12 which is centrally provided with a hole 16. Further, on the inner wall of the worm wheel 12 that bounds the hole 16 an inner thread 17 is provided. The spindle 3 is provided, on the outer wall thereof, with an outer thread 8 engaged by the inner thread 17. Upon actuation of the motor 15, the rotary motion of the output shaft 14 is converted into a translating movement of the spindle 3, so that the support 2 hinges relative to the base part 4.

The invention is not limited to the exemplary embodiments described here. Many variants are possible. Such variants will be clear to the skilled person and are understood to fall within the scope of the invention as set forth in the following claims.

The invention claimed is:

1. A mirror supporting plate for supporting a mirror glass of a wing mirror for a motor vehicle, comprising a substantially flat support provided with a substantially rod-shaped actuator part for coupling with a drive, wherein the actuator part is integrally formed with the support and the actuator part is configured to be adjustable relative to the support from a first position in which the actuator part is oriented substantially in or along the plane of the support, to a second position in which the actuator part is oriented so as to reach substantially outwards relative to the plane of the support.

2. The mirror supporting plate according to claim 1, wherein at least in the first position the actuator part and the support are connected by one or more bridge parts.

3. The mirror supporting plate according to claim 2, wherein at least one bridge part forms a torsion hinge.

4. The mirror supporting plate according to claim 2, wherein at least one bridge part forms a connection adapted to be broken loose.

5. The mirror supporting plate according to claim 2, wherein the support, the at least one bridge part, and the actuator part are comprised of thermoplastic material.

6. The mirror supporting plate according to claim 2, wherein at least one bridge part is comprised of a different plastic material than the support, the actuator part, or both the support and the actuator part.

7. The mirror supporting plate according to claim 1, wherein the support and the actuator part are each provided with coupling means that are adapted to form a snap connection in the second position.

8. The mirror supporting plate according to claim 7, wherein at least one of the bridge parts or the coupling means forms a ball binge.

9. The mirror supporting plate according to claim 1, wherein the actuator part comprises a spindle.

10. The mirror supporting plate according to claim 9, wherein the spindle includes thread or toothing.

11. The mirror supporting plate according to claim 1, wherein the support includes a coupling means for coupling with an output part of a hinge construction.

12. The mirror supporting plate according to claim 1, wherein the support comprises an accommodation opening to receive at least a portion of the actuator in the first position.

13. A mirror adjusting mechanism for a wing or motor vehicle comprising:
 a base part including a drive, and
 a mirror supporting plate including a substantially flat support having a substantially rod-shaped actuator part that is integrally formed with the support,
 wherein the mirror supporting plate is hinged to the base part, wherein the actuator part of the support is configured to be adjustable relative to the support and the actuator part is movable from a first position in which the actuator part is oriented substantially in or along the plane of the support, to a second position in which the actuator part is oriented to reach substantially outwards relative to the plane of the support, and wherein the actuator part is configured for coupling with the drive.

* * * * *